United States Patent
Li et al.

(10) Patent No.: US 9,451,640 B2
(45) Date of Patent: Sep. 20, 2016

(54) METHOD FOR ACQUIRING FORMAT OF RANDOM ACCESS SUBFRAME AND RECEIVER

(71) Applicant: ZTE CORPORATION, Guangdong (CN)

(72) Inventors: Lei Li, Shenzhen (CN); Xue Wang, Shenzhen (CN); Bin Li, Shenzhen (CN); Hongfeng Qin, Shenzhen (CN); Xiaoxiao Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/358,758

(22) PCT Filed: Jul. 22, 2013

(86) PCT No.: PCT/CN2013/079805
§ 371 (c)(1),
(2) Date: May 16, 2014

(87) PCT Pub. No.: WO2013/185671
PCT Pub. Date: Dec. 19, 2013

(65) Prior Publication Data
US 2015/0124716 A1 May 7, 2015

(30) Foreign Application Priority Data
Jul. 23, 2012 (CN) .......................... 2012 1 0256091

(51) Int. Cl.
*H04W 74/08* (2009.01)
*H04L 27/26* (2006.01)
*H04W 74/00* (2009.01)

(52) U.S. Cl.
CPC ...... *H04W 74/0833* (2013.01); *H04L 27/2666* (2013.01); *H04W 74/002* (2013.01)

(58) Field of Classification Search
CPC .................... H04L 27/2666; H04W 74/0833; H04W 74/002; H04W 74/08; H04W 74/008; H04W 74/0891; H04W 74/00
See application file for complete search history.

(56) References Cited

U.S. PATENT DOCUMENTS

| 7,404,013 B1 | 7/2008 | Masiewicz |
| 2007/0230600 A1* | 10/2007 | Bertrand ................ H04J 13/00 375/260 |

(Continued)

FOREIGN PATENT DOCUMENTS

| CN | 101123442 A | 2/2008 |
| CN | 102511189 A | 6/2012 |

OTHER PUBLICATIONS

International Search Report for PCT/CN2013/079805 dated Sep. 23, 2013.

(Continued)

*Primary Examiner* — Charles C Jiang
*Assistant Examiner* — Rose Clark
(74) *Attorney, Agent, or Firm* — Ling Wu; Stephen Yang; Ling and Yang Intellectual Property

(57) ABSTRACT

A method for acquiring a format of a random access subframe and a receiver are provided. The method includes: according to a cell radius supported currently and a cell coverage radius decided by the length of ZC sequence and the size of Ncs, a receiver determining the length of preamble sequence in an extended random access subframe; according to the cell radius supported currently and a cell coverage radius decided by the length of GT, determining the lengths of CP and GT in the extended random access subframe; according to sampling rates of a system where the receiver is located and the lengths of the preamble sequence and CP and GT, respectively calculating the numbers of sampling points of preamble sequence and GT and CP; based on the above numbers of sampling points, calculating the length of extended random access subframe, and determining the format of extended random access subframe.

12 Claims, 2 Drawing Sheets

(56) References Cited

U.S. PATENT DOCUMENTS

| | | | |
|---|---|---|---|
| 2008/0192678 A1* | 8/2008 | Bertrand | H04W 74/0866 370/328 |
| 2009/0067540 A1* | 3/2009 | Lee | H04W 74/004 375/296 |
| 2013/0051307 A1* | 2/2013 | Fan | H04W 76/02 370/315 |
| 2013/0089079 A1* | 4/2013 | Amirijoo | H04L 1/20 370/336 |

OTHER PUBLICATIONS

Translation of ISR.

* cited by examiner

METHOD FOR ACQUIRING FORMAT OF RANDOM ACCESS SUBFRAME AND RECEIVER

TECHNICAL FIELD

The present document relates to a technique of acquiring and receiving a format of the random access subframe, and particularly, to a method for acquiring the format of the random access subframe and a receiver.

BACKGROUND OF THE RELATED ART

In a Long Term Evolution (LTE) system, the random access technology is an important technology of access control of the receiver in the communication system, and the receiver completes the applications for uplink timing synchronous correction, user power adjustment and user resource demands through a random access process.

An uplink random access preamble of the LYE uses a cyclic shift sequence of the Zadoff-Chu (ZC) sequence, and a random access preamble code is derived by selecting different cyclic shifts (Ncs) based on the ZC sequence. A random access subframe is composed of three parts, namely a Cyclic Prefix (CP) part, a preamble sequence part and a Guard Time (GT) part respectively as shown in FIG. 1.

According to the difference of cell coverages, the lengths of demanded CP are different, and the length of preamble and the length of GT are also different. The existing LTE system supports 5 Formats, namely a Format 0, a Format 1, a Format 2, a Format 3 and a Format 4 respectively, and each format corresponds to a different cell coverage. A cell coverage radius is co-determined by the cyclic shift of the sequence and the GT.

Firstly, the cyclic shift decides whether a cell edge user can distinguish different cyclic shift windows, and the selection of cyclic shift must guarantee that the relevant peak values of the preamble sequence and local sequence of the cell edge user fall in a time window corresponding to the cyclic shift, and the length of the time window is $T_{Ncs}$:

$$T_{Ncs} = \frac{Ncs}{Nzc} \times T_{SEQ};$$

wherein, Nzc is the length of the ZC sequence, with regard to the Formats 0-3, a value of the Nzc is 839, and with regard to the Format 4, a value of the Nzc is 139. $T_{SEQ}$ is the length of the Random Access Channel (RACH) preamble sequence.

The cell coverage radius decided by the Ncs can be obtained according to the following formula:

CellRadius1=$0.5 \times T_{Ncs} \times 3 \times 10^5$ km/s.

A time reference reaching the receiver terminal already has a delay of D1 after the downlink synchronization is completed, and a delay of D2 also exists after the receiver sends a Physical Random Access Channel (PRACH) subframe to the base station, and D=D1≈D2 thus the time window $T_{Ncs}$ corresponding to one cyclic shift needs to absorb two delays 2D, and the supported cell radius is required to be halved.

In addition, the cell radius is also related to the GT, the length of CP and the length of GT decide that an RACH subframe of the cell edge user will not interfere with the subsequent subframes. Similarly, there exists the problem of uplink and downlink 2D delay, and the calculation formula thereof is as follows:

CellRadius2=$0.5 \times T_{GT} \times 3 \times 10^5$ km/s;

wherein, $T_{GT}$ is the length of guard time.

In conclusion, the cell radius is co-determined by the Ncs and the length of GT:

CellRadius=min(CellRadius1,CellRadius2)

According to the above calculation method, the maximum cell radius supported by each of Format 0~Format 4 is calculated as shown in FIG. 1, wherein Ts is a sampling interval, and Ts=1/30.72 μs.

TABLE 1

Cell coverage radiuses of different Formats

| Format | $T_{CP}$ | $T_{SEQ}$ | $T_{GT}$ | Supported cell radius |
|---|---|---|---|---|
| Format 0 | 3168 Ts | 24576 Ts | 2976 Ts | 14.5 km |
| Format 1 | 21024 Ts | 24576 Ts | 15840 Ts | 77 km |
| Format 2 | 6240 Ts | 2 * 24576 Ts | 6048 Ts | 30 km |
| Format 3 | 21024 Ts | 2 * 24576 Ts | 21984 Ts | 100 km |
| Format 4 | 448 Ts | 4096 Ts | 614 Ts | 3 km |

In a limiting case, with regard to the Format 3, when a value of the Ncs is 839, the maximum range of the supported cell is 100 km, and it can be seen that each of the five formats of the existing LTE random access fails to support the over-distance coverage beyond 100 km, and with regard to the over-distance coverage of air line, it is required to support the coverage beyond 100 km or even 200 km.

SUMMARY OF THE INVENTION

The example of the present document provides a method for acquiring a format of a random access subframe and a receiver, to solve the problem that the over-distance coverage beyond 100 km cannot be supported the related art.

In order to solve the above technical problem, the following technical scheme is adopted.

A method for acquiring a format of a random access subframe comprises:

a receiver determining the length of a preamble sequence in an extended random access subframe according to a cell radius required to be supported currently and a cell coverage radius decided by the length of a ZC sequence and the size of a cyclic shift (Ncs);

the receiver determining the length of a Cyclic Prefix (CP) and the length of a Guard Time (GT) in the extended random access subframe according to the cell radius required to be supported currently and a cell coverage radius decided by the length of the GT;

the receiver respectively calculating the number of sampling points of the preamble sequence, the number of sampling points of the GT and the number of sampling points of the CP according to a sampling rate of a system in which the receiver is located, the length of the preamble sequence, the length of the CP and the length of the GT; and the receiver calculating the length of the extended random access subframe according to the number of sampling points of the preamble sequence, the number of sampling points of the GT and the number of sampling points of the CP, and determining a format of the extended random access subframe.

Alternatively, the step of a receiver determining the length of a preamble sequence in an extended random access subframe according to a cell radius required to be supported currently and a cell coverage radius decided by the length of a ZC sequence and the size of Ncs comprises:

the receiver determining the length of a current preamble sequence according to the cell radius required to be supported currently and the cell coverage radius decided by the length of the ZC sequence and the size of the Ncs; and determining the length of the preamble sequence in the extended random access subframe according to the number of the current preamble sequences contained in the extended random access subframe, wherein, the number is one or more than one.

Alternatively, the step of the receiver determining the length of a CP and the length of a GT in the extended random access subframe according to the cell radius required to be supported currently and a cell coverage radius decided by the length of the GT comprises:

the receiver determining the length of the GT in the extended random access subframe according to the cell radius required to be supported currently and a cell coverage radius decided by the length of the GT; and determining the length of the CP according to the length of the GT and a difference between the length of the CP and the length of the GT being less than or equal to a value of preset length, wherein, the length of the CP is greater than the length of the GT.

Alternatively, a preferred value of the preset length is equal to an extended delay value of a radio channel.

Alternatively, the method further comprises:

the receiver selecting the format of the random access subframe according to parameters of the system in which the receiver is located, and if the existing format fails to support a cell required to be supported currently, using the format of the extended random access subframe to send the random access subframe.

A receiver comprises: a first determination module, a second determination module, a calculation module and a format determination module, wherein:

the first determination module is configured to: according to a cell radius required to be supported currently and a cell coverage radius decided by the length of a ZC sequence and the size of a cyclic shift (Ncs), determine the length of a preamble sequence in an extended random access subframe;

the second determination module is configured to: according to the cell radius required to be supported currently and a cell coverage radius decided by the length of a Guard Time (GT), determine the length of a Cyclic Prefix (CP) and the length of the GT in the extended random access subframe;

the calculation module is configured to: according to a sampling rate of a system in which the receiver is located, the length of the preamble sequence determined by the first determination module and the length of the CP and length of the GT determined by the second determination module, respectively calculate the number of sampling points of the preamble sequence, the number of sampling points of the GT and the number of sampling points of the CP; and the format determination module is configured to: calculate the length of the extended random access subframe according to the number of sampling points of the preamble sequence, the number of sampling points of the GT and the number of sampling points of the CP, and determine a format of the extended random access subframe.

Alternatively, the first determination module is configured to determine the length of the preamble sequence in the extended random access subframe according to the following way:

according to the cell radius required to be supported currently and the cell coverage radius decided by the length of the ZC sequence and the size of the Ncs, determining the length of a current preamble sequence; and according to the number of the current preamble sequences contained in the extended random access subframe, determining the length of the preamble sequence in the extended random access subframe, wherein, the number is one or more than one.

Alternatively, the second determination module is configured to determine the length of the CP and the length of the GT in the extended random access subframe according to the following way:

according to the cell radius required to be supported currently and a cell coverage radius decided by the length of the GT, determining the length of the GT in the extended random access subframe; and according to the length of the GT and a difference between the length of the CP and the length of the GT being less than or equal to a value of preset length, determining the length of the CP, wherein, the length of the CP is greater than the length of the GT.

Alternatively, a preferred value of the preset length is equal to an extended delay value of a radio channel.

Alternatively, the receiver further comprises: a sending module, wherein:

the sending module is configured to: select a format of a random access subframe according to parameters of the system in which the receiver is located, and if the existing format fails to support a cell required to be supported currently, use the format of the extended random access subframe determined by the format determination module to send the random access subframe.

In the above technical scheme, by adopting the format of the extended random access subframe, the cell coverage radius is increased; and according to the above extension principle, it can be guaranteed that all cell radiuses are covered, and it can be guaranteed that the existing processing ways of the base station and the User Equipment (UE) are basically unchanged.

PREFERRED EMBODIMENTS OF THE PRESENT INVENTION

In order to make the object, technical scheme and advantages of the present document more clear, the examples of the present document will be described in detail in combination with the accompanying drawings below. It should be noted that the examples in the present document and the characteristics in the examples can be optionally combined with each other in the condition of no conflict.

The example of the present document provides a random access method, and the method includes the following steps.

In step 101, a receiver performs cell searching and downlink synchronization after starting up.

The step has been disclosed in the related art.

Figure 1:
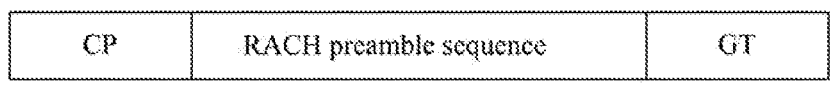
FIG. 1 is a schematic diagram of format of the current random access subframe.
Figure 2:
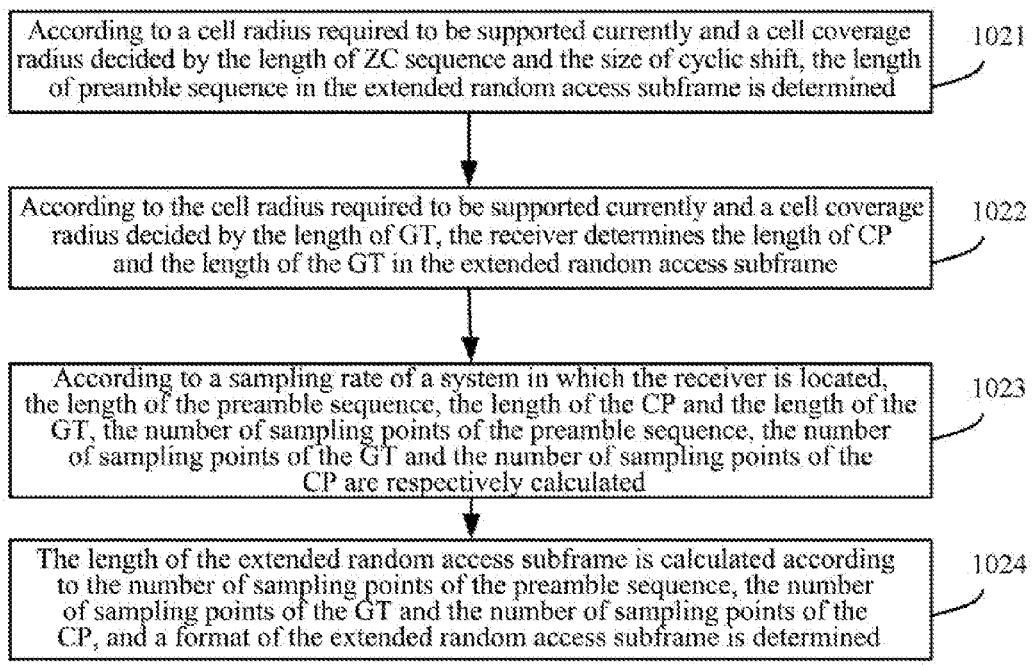
FIG. 2 is a flow diagram of the method for acquiring the format of the random access subframe according to the example of the present document.

In step 102, according to the parameters of the system in which the receiver is located, a format of the random access subframe is selected, and if each of the existing five formats fails to support the demanded cell coverage, it is required to select a format of the extended random access subframe, and the process of acquiring the format of the extended random access subframe is as shown in FIG. 2, and steps 1021 to 1024 are included.

In step 1021, according to a cell radius required to be supported currently and a cell coverage radius decided by the length of a ZC sequence and the size of a cyclic shift (Ncs), the length of a preamble sequence in the extended random access subframe is determined.

Specifically, according to the cell radius required to be supported and the calculation way of CellRadius1, the length $T_{SEQ}$ of the current preamble sequence is determined:

$$T_{SEQ} \geq \frac{2 \times CellRadius}{3 \times 10^5} \times \frac{Ncs}{Nzc} (ms).$$

The receiver can determine the length of the preamble sequence in the extended random access subframe according to the number of the current preamble sequences contained in the extended random access subframe, wherein the number is one or more than one, that is, the part of preamble sequence can be repeated, so as to obtain the performance gain.

In step 1022, according to the cell radius required to be supported currently and a cell coverage radius decided by the length of a Guard Time (GT), the receiver determines the length of a Cyclic Prefix (CP) and the length of the GT in the extended random access subframe.

According to the cell radius required to be supported and the calculation way of CellRadius2, the length of the GT in the random access subframe is determined, and it is required to guarantee that a difference between the length of the CP and the length of the GT does not exceed $T_d$, wherein the length of the CP is greater than the length of the GT, and $T_d$ can be an extended delay value of the radio channel.

$$T_{GT} \geq \frac{2 \times CellRadius}{3 \times 10^5} (ms), T_d = 0 \sim 1 \text{ ms}.$$

In step 1023, according to a sampling rate of a system in which the receiver is located, the length of the preamble sequence, the length of the CP and the length of the GT, the number of sampling points of the preamble sequence, the number of sampling points of the GT and the number of sampling points of the CP are respectively calculated.

Specifically, the number of sampling points of the random access preamble, the number of sampling points of the GT and the number of sampling points of the CP are calculated according to a value of the sampling rate $T_s$ of the system, a value of the $T_{SEQ}$, a value of the $T_{GT}$ and a value of the $T_{CP}$.

$$T_{SEQNUM} = \left\lceil \frac{T_{SEQ}}{T_s} \right\rceil, T_{GTNUM} = \left\lceil \frac{T_{GT}}{T_s} \right\rceil, T_{CPNUM} = \left\lceil \frac{T_{CP}}{T_s} \right\rceil.$$

In step 1024, the length of the extended random access subframe is calculated according to the number of sampling points of the preamble sequence, the number of sampling points of the GT and the number of sampling points of the CP, and a format of the extended random access subframe is determined.

Wherein, the length $T_{PRACH}$ of the random access subframe can be calculated by using the following formula:

$$T_{PRACH} + (T_{GTNUM} + T_{CPNUM} + T_{SEQNUM}) \times T_s.$$

In step 103, the random access subframe is sent according to the format of the extended random access subframe selected in the step 102.

In the above random access method, by adopting the format of the extended random access subframe, the cell coverage radius is increased; and according to the above extension principle, it can be guaranteed that all cell radiuses are covered, and it can be guaranteed that the existing processing ways of the base station and the UE are basically unchanged.

Example

In step 201, a receiver performs cell searching and downlink synchronization after starting up.

By searching for a primary synchronization sequence, the receiver can obtain a 5 ms reference time, then by searching for a secondary synchronization sequence, the receiver can obtain frame synchronization and physical-layer cell group, and finally through a reference signal, the receiver obtains a physical-layer cell Identification (ID), thus the downlink synchronization is completed at this point, and the time reference $T_0$ is obtained.

In step 202, it is assumed that it needs to support the cell coverage of 240 km, and all the existing Formats fail to support the cell coverage, thus the redesigned format of the extended random access subframe is as follows.

Firstly, according to the cell radius r=240 km required to be supported and the calculation way of CellRadius1, Ncs=839 and Nzc=839, the length $T_{SEQ}$ of the random access preamble sequence is determined:

$$T_{SEQ} \geq \frac{2 \times r}{3 \times 10^5} \times \frac{N_{cs}}{N_{zc}} (ms) = 1.6 \text{ ms}.$$

Secondly, according to the cell radius required to be supported and the calculation way of CellRadius2, the length of the CP and length of the GT in the random access subframe are determined, and it is guaranteed that a difference between the length of the CP and the length of the GT does not exceed $T_d$, wherein the length of the CP is greater than the length of the GT, and it is assumed that an extended delay value of the radio channel is 0.2 ms.

$$T_{GT} \geq \frac{2 \times r}{3 \times 10^5} = 1.6 \text{ ms}, T_d = 0.2 \text{ ms}.$$

In the example, $T_{GT}$=1.6 ms, $T_{CP}$=1.8 ms.

Thirdly, the number of sampling points of the random access preamble, the number of sampling points of the GT and the number of sampling points of the CP are calculated according to the sampling rate $T_s$=1/30.72 μs of the system, the length of $T_{SEQ}$ and the length of $T_{GT}$.

$$T_{SEQNUM} = \left\lceil \frac{T_{SEQ}}{T_s} \right\rceil = 49152 T_s;$$

$$T_{GTNUM} = \left\lceil \frac{T_{GT}}{T_s} \right\rceil = 49152 T_s;$$

$$T_{CPNUM} = \left\lceil \frac{T_{CP}}{T_s} \right\rceil = 55296 T_s.$$

Finally, the length of the random access subframe is calculated.

$$T_{PRACH} = (T_{GTNUM} + T_{CPNUM} + T_{SEQNUM}) \times T_s = 5 \text{ ms}.$$

Figure 3:
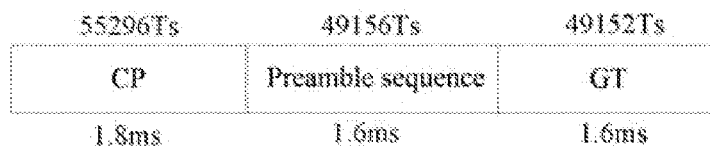
FIG. 3 is a schematic diagram of format of the extended random access subframe according to the example of the present document.

The format of the extended random access subframe obtained according to the above process is as shown in FIG. 3.

In step 203, the random access subframe is sent according to the format of the extended random access subframe obtained in the step 202.

As shown in FIG. 3, the length of the preamble sequence is 1.6 ms, namely 49152 Ts, the length of the CF is 1.8 ms, namely 55296 Ts, the length of the GT is 1.6 ms, namely 49152 Ts, and the format occupies 5 ms in total. According to the method for calculating the cell coverage radius, it can be deduced that:

$$CellRadius1 = 0.5 \times \frac{Ncs}{Nzc} \times T_{SEQ} \times \frac{0.01s}{307200Ts} \times 3 \times 10^5 \text{ km} = 240 \text{ km};$$

$$CellRadius2 = 0.5 \times GTnum \times \frac{0.01s}{307200Ts} \times 3 \times 10^5 \text{ km} = 240 \text{ km};$$

$$CellRadius = \min(CellRadius1, CellRadius2) = 240 \text{ km}.$$

It can be seen that the format of the extended random access subframe given in the example can support the cell coverage of 240 km.

Figure 4:
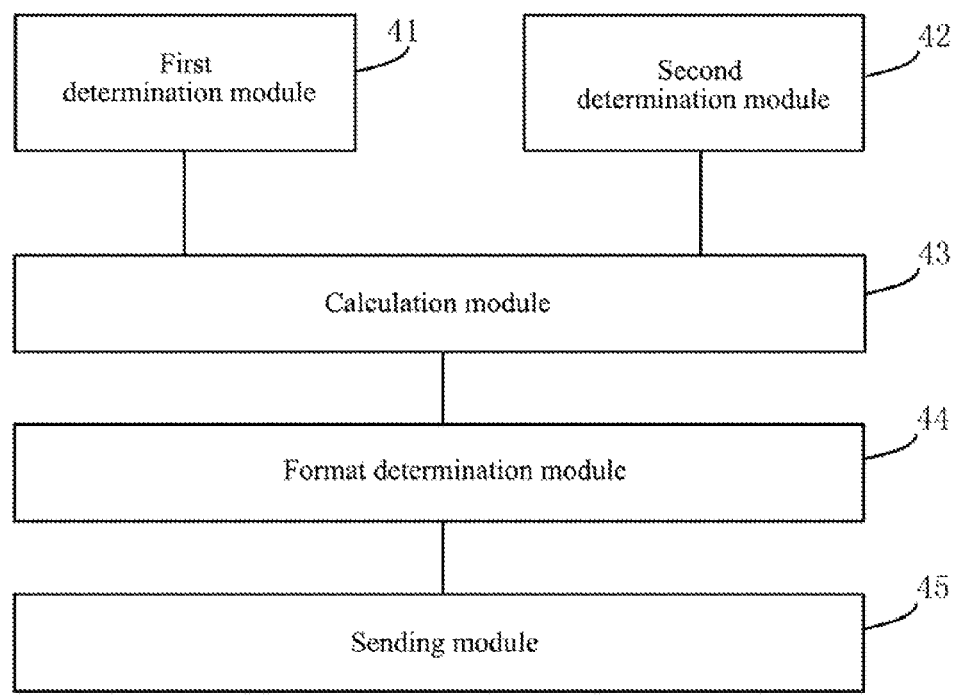
FIG. 4 is a schematic diagram of structure of the receiver according to the example of the present document.

As shown in FIG. 4, it is a schematic diagram of structure of the receiver according to the example of the present document, and the receiver includes a first determination module 41, a second determination module 42, a calculation module 43 and a format determination module 44, wherein:

the first determination module 41 is configured to: according to a cell radius required to be supported currently and a cell coverage radius decided by the length of a ZC sequence and the size of a cyclic shift (Ncs), determine the length of a preamble sequence in an extended random access subframe;

the second determination module 42 is configured to: according to the cell radius required to be supported currently and a cell coverage radius decided by the length of a Guard Time (GT), determine the length of a Cyclic Prefix (CP) and the length of the GT in the extended random access subframe;

the calculation module 43 is configured to: according to a sampling rate of a system in which the receiver is located, the length of the preamble sequence determined by the first determination module 41, and the length of the CP and the length of the GT determined by the second determination module 42, respectively calculate the number of sampling points of the preamble sequence, the number of sampling points of the GT and the number of sampling points of the CP; and the format determination module 44 is used to: calculate the length of the extended random access subframe according to the number of sampling points of the preamble sequence, the number of sampling points of the GT and the number of sampling points of the CP, and determine a format of the extended random access subframe.

Wherein, the first determination module 41 is configured to determine the length of the preamble sequence in the extended random access subframe according to the following way: according to the cell radius required to be supported currently and the cell coverage radius decided by the length of the ZC sequence and the size of the Ncs, determining the length of the current preamble sequence; and according to the number of the current preamble sequences contained in the extended random access subframe, determining the length of the preamble sequence in the extended random access subframe, wherein, the number is one or more than one.

The second determination module is configured to determine the length of the CP and the length of the GT in the extended random access subframe according to the following way: according to the cell radius required to be supported currently and a cell coverage radius decided by the length of the GT, determining the length of the GT in the extended random access subframe; and according to the length of the GT and a difference between the length of the CP and the length of the GT being less than or equal to a value of preset length, determining the length of the CP, wherein, the length of the CP is greater than the length of the GT.

The above value of preset length can be dynamically set according to the requirement, for example, it can be 0.2 ms, and a preferred value is an extended delay value of the radio channel. Furthermore, the receiver also includes: a sending module 45, which is used to: select a format of the random access subframe according to parameters of the system in which the receiver is located, and if the existing format fails to support a cell required to be supported currently, use the format of the extended random access subframe determined by the format determination module to send the random access subframe.

The example of the present document also provides a terminal containing the above receiver.

The receiver and the terminal can be applied in the long term evolution system.

With the above receiver and terminal, by adopting the format of the extended random access subframe, the cell coverage radius is increased; and according to the above extension principle, it can be guaranteed that all cell radiuses are covered, and it can be guaranteed that the existing processing ways of the base station and the receiver are basically unchanged The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present document is not limited to any combination of hardware and software in a specific form.

The above examples are only used to explain the technical scheme of the present document, which is not used to limit the technical scheme of the present document, and the present document is just described in detail in combination with the preferred examples. The ordinary person skilled in the art should understand that, with regard to the technical scheme of the present document, modifications or equivalent substitutions can be made without departing from the spirit and scope of the technical scheme of the present document, and all these modifications and equivalent substitutions should be covered within the scope of the claims of the present document.

INDUSTRIAL APPLICABILITY

In the above technical scheme, by adopting the format of the extended random access subframe, the cell coverage radius is increased; and according to the above extension principle, it can be guaranteed that all cell radiuses are covered, and it can be guaranteed that the existing processing ways of the base station and the UE are basically unchanged. Therefore, the present document has a strong industrial applicability.

What is claimed is:

1. A method for acquiring a format of a random access subframe, comprising:
   a receiver determining the length of a preamble sequence in an extended random access subframe according to a cell radius required to be supported currently and a cell coverage radius decided by the length of a ZC sequence and the size of a cyclic shift (Ncs);
   the receiver determining the length of a Cyclic Prefix (CP) and the length of a Guard Time (GT) in the extended random access subframe according to the cell radius required to be supported currently and a cell coverage radius decided by the length of the GT;
   the receiver respectively calculating the number of sampling points of the preamble sequence, the number of sampling points of the GT and the number of sampling points of the CP according to a sampling rate of a system in which the receiver is located, the length of the preamble sequence, the length of the CP and the length of the GT; and
   the receiver calculating the length of the extended random access subframe according to the number of sampling points of the preamble sequence, the number of sampling points of the GT and the number of sampling points of the CP, and determining a format of the extended random access subframe;
   wherein: the step of the receiver determining the length of a CP and the length of a GT in the extended random access subframe according to the cell radius required to be supported currently and a cell coverage radius decided by the length of the GT comprises:
   the receiver determining the length of the GT in the extended random access subframe according to the cell radius required to be supported currently and the cell coverage radius decided by the length of the GT; and determining the length of the CP according to the length of the GT and a difference between the length of the CP and the length of the GT being less than or equal to a value of preset length, wherein the length of the CP is greater than the length of the GT.

2. The method according to claim 1, wherein: the step of a receiver determining the length of a preamble sequence in an extended random access subframe according to a cell radius required to be supported currently and a cell coverage radius decided by the length of a ZC sequence and the size of an Ncs comprises:
   the receiver determining the length of a current preamble sequence according to the cell radius required to be supported currently and the cell coverage radius decided by the length of the ZC sequence and the size of the Ncs; and determining the length of the preamble sequence in the extended random access subframe according to the number of the current preamble sequences contained in the extended random access subframe, wherein, the number is one or more than one.

3. The method according to claim 1, wherein:
   a preferred value of the preset length is equal to an extended delay value of a radio channel.

4. The method according to claim 1, further comprising:
   the receiver selecting the format of the random access subframe according to parameters of the system in which the receiver is located, and if existing formats fail to support a cell required to be supported currently, using the format of the extended random access subframe to send the random access subframe.

5. A receiver, comprising hardware performing instructions stored in a non-transitory computer readable medium which executes steps in following modules: a first determination module, a second determination module, a calculation module and a format determination module, wherein:
   the first determination module is configured to: according to a cell radius required to be supported currently and a cell coverage radius decided by the length of a ZC sequence and the size of a cyclic shift (Ncs), determine the length of a preamble sequence in an extended random access subframe;
   the second determination module is configured to: according to the cell radius required to be supported currently and a cell coverage radius decided by the length of a Guard Time (GT), determine the length of a Cyclic Prefix (CP) and the length of the GT in the extended random access subframe;
   the calculation module is configured to: according to a sampling rate of a system in which the receiver is located, the length of the preamble sequence determined by the first determination module, and the length of the CP and the length of the GT determined by the second determination module, respectively calculate the number of sampling points of the preamble sequence, the number of sampling points of the GT and the number of sampling points of the CP; and
   the format determination module is configured to: calculate the length of the extended random access subframe according to the number of sampling points of the preamble sequence, the number of sampling points of the GT and the number of sampling points of the CP, and determine a format of the extended random access subframe;
   wherein: the second determination module is configured to determine the length of the CP and the length of the GT in the extended random access subframe according to the following way:
   according to the cell radius required to be supported currently and the cell coverage radius decided by the length of the GT, determining the length of the GT in the extended random access subframe; and according to the length of the GT and a difference between the length of the CP and the length of the GT being less than or equal to a value of preset length, determining the length of the CP, wherein the length of the CP is greater than the length of the GT.

6. The receiver according to claim 5, wherein: the first determination module is configured to determine the length of the preamble sequence in the extended random access subframe according to the following way:
   according to the cell radius required to be supported currently and the cell coverage radius decided by the length of the ZC sequence and the size of the Ncs, determining the length of a current preamble sequence; and according to the number of the current preamble sequences contained in the extended random access subframe, determining the length of the preamble sequence in the extended random access subframe, wherein the number is one or more than one.

7. The receiver according to claim 5, wherein:

a preferred value of preset length is equal to an extended delay value of a radio channel.

8. The receiver according to claim 5, wherein the hardware performing instructions stored in the non-transitory computer readable medium further executes steps in a sending module, wherein:

the sending module is configured to: select a format of a random access subframe according to parameters of the system in which the receiver is located, and if existing formats fail to support a cell required to be supported currently, use the format of the extended random access subframe determined by the format determination module to send the random access subframe.

9. The method according to claim 2, further comprising:

the receiver selecting the format of the random access subframe according to parameters of the system in which the receiver is located, and if existing formats fail to support a cell required to be supported currently, using the format of the extended random access subframe to send the random access subframe.

10. The method according to claim 3, further comprising:

the receiver selecting the format of the random access subframe according to parameters of the system in which the receiver is located, and if existing formats fail to support a cell required to be supported currently, using the format of the extended random access subframe to send the random access subframe.

11. The receiver according to claim 6, wherein the hardware performing instructions stored in the non-transitory computer readable medium further executes steps in a sending module, wherein:

the sending module is configured to: select a format of a random access subframe according to parameters of the system in which the receiver is located, and if existing formats fail to support a cell required to be supported currently, use the format of the extended random access subframe determined by the format determination module to send the random access subframe.

12. The receiver according to claim 7, wherein the hardware performing instructions stored in the non-transitory computer readable medium further executes steps in a sending module, wherein:

the sending module is configured to: select a format of a random access subframe according to parameters of the system in which the receiver is located, and if existing formats fail to support a cell required to be supported currently, use the format of the extended random access subframe determined by the format determination module to send the random access subframe.

\* \* \* \* \*